United States Patent
Lepsius et al.

(10) Patent No.: US 6,855,221 B1
(45) Date of Patent: Feb. 15, 2005

(54) USE OF A FILM WITH ANCHORING ELEMENTS FOR A MECHANIC FIXATION

(75) Inventors: Tilwin Lepsius, Duesseldorf (DE); Wolfgang Klauck, Meerbusch (DE); Gaby Schilling, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 89 days.

(21) Appl. No.: 10/018,626

(22) PCT Filed: Jun. 9, 2000

(86) PCT No.: PCT/EP00/05339

§ 371 (c)(1),
(2), (4) Date: May 14, 2002

(87) PCT Pub. No.: WO00/79073

PCT Pub. Date: Dec. 28, 2000

(30) Foreign Application Priority Data

Jun. 18, 1999 (DE) .......... 199 27 790

(51) Int. Cl.⁷ .......... B32B 31/00
(52) U.S. Cl. .......... 156/71; 156/92; 156/289
(58) Field of Search .......... 156/71, 91, 92, 156/247, 289, 574

(56) References Cited

U.S. PATENT DOCUMENTS

| | | | |
|---|---|---|---|
| 4,058,853 A | 11/1977 | Boxer et al. | |
| 4,974,384 A | 12/1990 | Pacione | 52/483 |
| 5,144,786 A | * 9/1992 | Pacione | 52/747 |
| 5,382,462 A | * 1/1995 | Pacione | 428/95 |
| 5,515,583 A | 5/1996 | Higashinaka | |
| 5,679,302 A | 10/1997 | Miller et al. | |
| 5,691,027 A | * 11/1997 | Eckhardt et al. | 428/100 |
| 5,860,255 A | 1/1999 | Eishel et al. | 52/169.14 |
| 6,106,922 A | 8/2000 | Cejka et al. | |
| 6,120,867 A | 9/2000 | Hamerski et al. | |
| 2002/0009568 A1 | 1/2002 | Bries et al. | |

FOREIGN PATENT DOCUMENTS

| | | |
|---|---|---|
| DE | 70 29 524 | 8/1970 |
| DE | 1 784 067 | 7/1971 |
| DE | 89 05 893 | 8/1989 |
| DE | 89 05 898 | 12/1989 |
| DE | 42 28 597 A1 | 3/1994 |
| DE | 298 17 398 | 3/1999 |
| LU | 64754 | 2/1972 |
| WO | WO 01/00066 A1 | 1/2001 |

* cited by examiner

Primary Examiner—James Sells
(74) Attorney, Agent, or Firm—Stephen D. Harper; Glenn E. I. Murphy

(57) ABSTRACT

A method of nondestructive, reversible fixing of a coherent layer to a substrate, comprising the steps of anchoring a nonfibrous coherent layer to a film having either or both of projecting or embedded anchoring elements, wherein the anchoring elements provide mechanical anchorage of the coherent layer to the film, and fixing the coherent layer and film to the substrate. The coherent layer is anchored by applying a liquid or paste form material to the substrate that sets on the substrate to form the coherent layer, which is nonadhesive or only slightly adhesive to the film.

35 Claims, 4 Drawing Sheets a)

b)

c)

a)

b)

c)

d)

e)

f)

a)

b)

c)

d)

e)

a)

b)

USE OF A FILM WITH ANCHORING ELEMENTS FOR A MECHANIC FIXATION

CROSS-REFERENCE TO RELATED APPLICATIONS

This application is a U.S. National Stage application filed under 35 U.S.C. § 371 of International Application No. PCT/EP00/05339, claiming priority under 35 U.S.C. §§ 119 and 365 of PCT/EP00/05339, filed Jun. 9, 2000, in the European Patent Office, and DE 199 27 790.7, filed Jun. 18, 1999, in the German Patent Office.

This invention relates to the use of a film with anchoring elements for mechanically fixing a coherent layer to a substrate.

One such use is known. Thus, DE 7029524 describes a device for fixing wall, ceiling, floor or other surface coverings which consists of an intermediate support with anchoring elements and of a nonwoven to which nonfibrous covering materials, for example paper, plastic films, plastic moldings, wood and metals, are fixed. This device has the major advantage that the connections can be easily and completely broken at a certain place. However, it also has the disadvantage that the joined substrates are very difficult to reposition relative to one another. This applies in particular to substrates of large surface area. In addition, coverings which level out uneven surfaces are not possible.

Accordingly, the problem addressed by the present invention was to find a way of reversibly joining two substrates which would not have any of these disadvantages and which in addition would provide a composite material that would be able to withstand routine tensile shear stresses while allowing easy and almost complete separation. In addition, the substrates would be reusable after separation.

The solution to this problem as provided by the invention is defined in the claims and is essentially characterized in that a fibrous layer is not used for mechanical anchoring with the anchoring elements of a film.

DESCRIPTION OF THE INVENTION

According to the invention, a liquid substance is directly applied to and solidified on the film with the anchoring elements. Minimal adhesion should occur between the film with the anchoring elements and the solidified liquid substance. Cohesion should be largely provided by the mechanical anchorage of the solidified liquid substance. In addition, tearing off of the anchoring elements during separation of the solidified liquid substance from the film with the anchoring elements should largely be avoided by a suitable choice a) of deformable materials and b) slidable forms of the anchoring elements. The anchoring elements should withstand separation without damage (see FIG. 1).

The present invention relates to the use of a film with projecting and/or embedded anchoring elements for mechanically fixing a coherent layer to a substrate, the coherent layer being nonfibrous. The preferred embodiments can be found in the characterizing features of the claims.

The present invention also relates to a double-sided adhesive tape of a film with anchoring elements on at least one side instead of an otherwise typical smooth film, a woven fabric or a nonwoven, the adhesion of the pressure sensitive adhesive layer of the film on one side of the film being so low that it can be peeled off intact.

The present invention also relates to a film with embedded anchoring elements.

The present invention further relates to a velcro tape of elastomers, more particularly thermoplastic elastomers.

Films in the context of the invention are understood to be thin, flat flexible webs of metals, glass, ceramic and, above all, plastics. Their thickness is preferably in the range from 0.04 to 2 mm. However, they may also be considerably thicker in cases where the flexibility of the webs and their ability to be rolled up easily are not important criteria. More particularly, moldings provided with anchoring elements during their actual production, for example plates or bars, may be used.

The surface of the film is appropriate and, in particular, may be round or strip-like with a width of 0.2 to 1,000 and more particularly 1 to 500 cm for a length of 0.05 to 5,000 and more particularly 0.1 to 4,000 m. The film is generally compact, i.e. has no pores or holes or only small pores or holes. The sum of the holes makes up at most 10% of the total surface area. The shape, size and number of holes should be such that, although the desired permeability to gases and vapors is achieved, none of the still liquid phase strikes through during the production of the coherent layer.

The material of the film is either metal or plastic, preferably plastic, more particularly a polyolefin, such as polyethylene or polypropylene, polyamide, polyvinyl chloride, a fluorine-containing polymer, silicone or a polyurethane elastomer or utility articles coated therewith. In one particular embodiment, the films and anchoring elements consist of the same material. However, they may also consist of a combination of materials.

Corresponding films are known in large numbers. When choosing the film, the deformability and adhesion of the nonfibrous coherent layer should be taken into consideration. Adhesion should be low and the deformability of the anchoring elements and/or the nonfibrous coherent layer should be so high that the anchoring elements largely retain their function, i.e. are not tom off, during separation of the layers.

The low adhesion between the film and the nonfibrous coherent layer may emanate from the nature of the materials used. However, it may also be obtained by a pretreatment before application of the liquid nonfibrous layer, for example by spraying with water or by coating with wax or similar materials that are difficult to bond.

The deformability of the anchoring elements or the coherent nonfibrous layer may also emanate from the nature of the materials used or may be attributed to physical measures, for example porosity.

The shape of the anchoring elements is of course also important. If, for example, the nonfibrous coherent layer consists of a non-deformable material such as, for example, cement- or gypsum-based binders or a two-component epoxide, the anchoring elements should be relatively readily deformable and elastic both in their constituent material and in their shape, for example should consist of plastics, such as PE, PP, silicone or rubber.

One side of the film is generally smooth so that it may readily be fixed to the substrate either by a covered adhesive layer or by nails and screws. It may also have anchoring elements on both sides, particularly when the substrate is fibrous or when the same adhesive is to be used both for fixing the film to the substrate and for fixing to the substrate.

The number of anchoring elements depends inter alia on the required level of adhesion and is generally between 0.1 and 2,000 and preferably between 1 and 500 g per $cm^2$.

The film has anchoring elements an at least one side. Their length is at least 0.05 mm and preferably at least 0.2 mm and only rarely exceeds 10 mm. The anchoring elements may be embedded In the film, but preferably project beyond the plane of the film. In the latter case, the film may be a typical velcro tape, an antislip tape or a "stubble" film, for example a flocked film. However, not all forms of anchoring elements of typical velcro tapes are equally suitable. Thus, anchoring elements with undercuts (acute angle between pin and hook) or with loop-like spirals or closed loops are unfavorable. The same applies to anchoring elements with such an intensive anchoring effect that they are torn out during separation. Thus, in the case of a mushroom-shaped anchoring element, the cross-sectional diameter of the cap should be less than 10 times the value of the stalk of the mushroom. Anchoring elements with loops are of course particularly unfavorable (see FIG. 2). The shapes of the anchoring elements are favorable when they allow sliding out from the coherent layer without losing their function Or being torn off (see FIG. 3). Particularly favorable forms are characterized in that the angle between the pin and the hook is 90° or larger (see FIG. 4). However, it must be smaller than 180° because otherwise no hooking occurs unless the pin is oblique rather than vertical in relation to the film. If then the pins still point in different directions, they also effect anchorage of the nonfibrous coherence layer. In contrast to conventional velcro tapes, the anchoring elements or their pins may also form an angle of less than 90° and preferably less than 45° to the film. Which angle is the most favorable will depend inter alia on the deformability of the coherent layer.

In general, the ends of the anchoring elements are not pin-like, but thickened (heads), angled or bent downwards (hooks) or flattened off (mushroom shape). FIGS. 1a, 1b and 1c schematically illustrate the change in the cross-sectional form of a readily deformable anchoring element (1), a) during the first coating with the coherent layer, b) during its separation in the hardened state and c) before the second coating. The cap of the mushroom is deformed during separation. Recovery may not be 100% (compare 1c) with 1a)).

FIGS. 2a) to 2f) show schematic cross-sections of the shapes of anchoring elements which are unsuitable for nondestructive separation, even when the nonfibrous coherent layer is readily deformable. This is because they have undercuts (see 2a) and 2b)) or even loops (2c), 2d) and 2e)). The shape 2f) is unfavorable on account of the size ratio of mushroom cap to mushroom stalk.

FIGS. 3a), b), c), d) and e) are schematic cross-sections through the shapes of readily deformable anchoring elements which are favourable for nondestructive separation.

Figure 1:
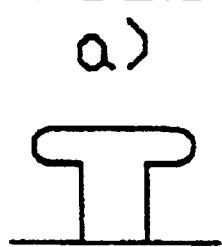
Figure 1:
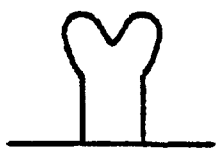
Figure 1:
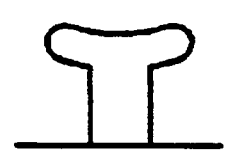
Figure 2:
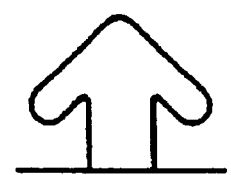
Figure 2:
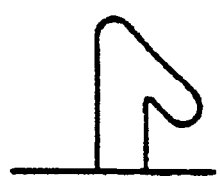
Figure 2:
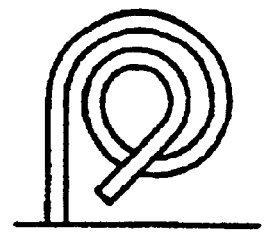
Figure 2:
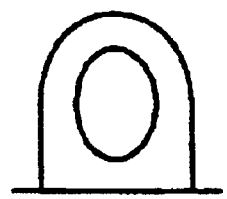
Figure 2:
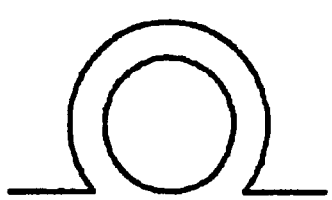
Figure 2:
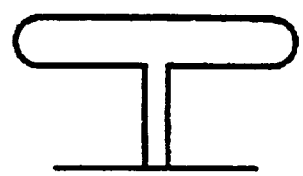
Figure 3:
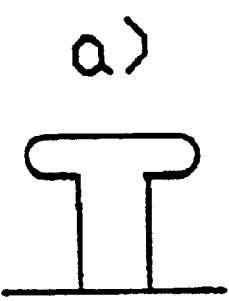
Figure 3:
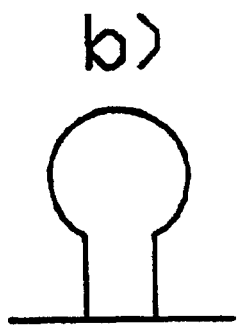
Figure 3:
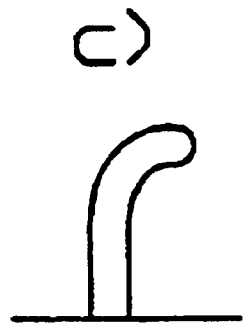
Figure 3:
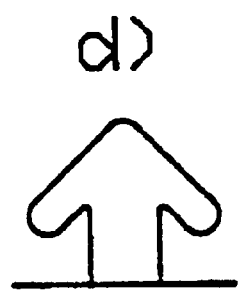
Figure 3:
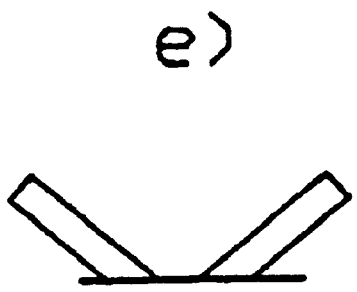
Figure 4:
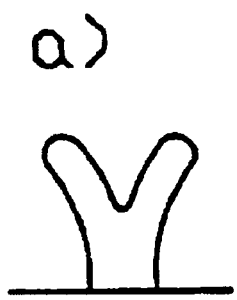
FIG. 4 is a schematic cross-section through a shape of an anchoring element of a material that does not readily deform a) during coating and b) during separation.
Figure 4:
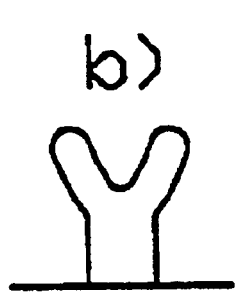
Figure 5:
FIG. 5 is a schematic cross-section through the film (2) with (a) only embedded anchoring elements and (b) a combination of embedded and projecting anchoring elements.

Where the nonfibrous coherent layer is completely or substantially nondeformable, the anchoring elements preferably consist of a material which is barely deformable, if at all, in a thin layer of 0.05 to 10 mm.

The composite material produced in accordance with the invention withstands tensile stresses comparable with those known for the particular application, but is weaker in its peel strength by a factor of at least 2 and preferably by a factor of >5 by comparison with peel strengths on typical substrates without the film with anchoring elements. Accordingly, relatively little force has to be applied for separation. Separation takes place specifically on the film, the anchoring elements remaining largely intact and being available for reuse.

Other advantages of the fixing according to the invention are:
repositionability of the substrates providing the nonfibrous layer has not solidified,
substantially complete separation and
gap bridging at any level.
Leveling of uneven substrates is readily possible through the variable thickness of the nonfibrous layer.

The nonfibrous coherent layer is formed on the film with the anchoring elements by the application in liquid form of a solidifiable substance as a layer in the required thickness—preferably thicker than corresponds to the height of the projecting anchoring elements, even in the set state. In the case of the embedded anchoring elements, it has to be so liquid that it penetrates at least partly into the voids. In the case of the projecting anchoring elements, it may be pasta-like or kneadable, for example a surfacing compound or kneading compound. A paste-like compound is understood to be one with a Brookfield viscosity in the range from 20,000 to 1,000,000 mPas, as measured at the application temperature of −100 to 300° C. and preferably −31 to 200° C. High-viscosity pastes may also be used, particularly for horizontal application. In their case, the viscosity is in the range from 2,000 to 20,000 mPas. Compounds with viscosities of more than 1,000,000 mPas may also be used providing they can be incorporated in the anchoring elements, for example by kneading.

When the film is being coated with the anchoring elements, it is of course important to ensure that the anchoring elements are not destroyed either by mechanical forces or by melting where, for example, heated compounds, such as hotmelt adhesives, are applied.

The initially liquid nonfibrous layer sets and solidifies, such high cohesion being developed that the nonfibrous layer can be separated intact and almost completely from the film despite the anchoring elements. This solid coherent layer is generally compact, but may also be porous.

The usual inorganic and organic binders are used including, for example, hydraulic binders (for example cement), lime mortar, gypsum, waterglass, polymer dispersions, polymer melts, polymer solutions, reactive one- or two-component polymer-based systems with the usual additives. Nonfibrous setting layers are plasters, lacquers, paints, road markings, PU foams, sealing compounds. Adhesives of any kind with which the substrates or elements can be joined, even without films, are preferred.

In the hardened state, the coherent nonfibrous layer is nonadhesive or only slightly adhesive towards the film with the anchoring elements, the adhesion level amounting to at most 100% and preferably to at most 50% of the mechanical anchorage value. It is crucial that, when the layer is subsequently peeled off, its inner strength is higher than the sum of the adhesive strength and the mechanical anchorage.

The coherent nonfibrous layer is preferably an adhesive or contains binders typical of adhesives, i.e. it joins the substrate to a surface layer.

The surface layer or the substrate is generally a protective or decorative layer, for example wall, ceiling or floor coverings for buildings or vehicles, for example wallpapers, inlaid floors, laminates, insulating boards, protective films, tiles, floor tiles, marble tiles, clay tiles, roof panels, carpets, pictures, shelves, panes of glass, bricks, coverings, claddings, etc.

The substrate may consist of masonry, plasters, concrete, screeds, surfacing fillers, metal, wood and plastic surfaces, tiles, glass.

The film seals the substrate in the usual way, depending on its thickness and its constituent material. However, its permeability to air, water vapor and other gases may be improved by a certain porosity.

Figure 6:
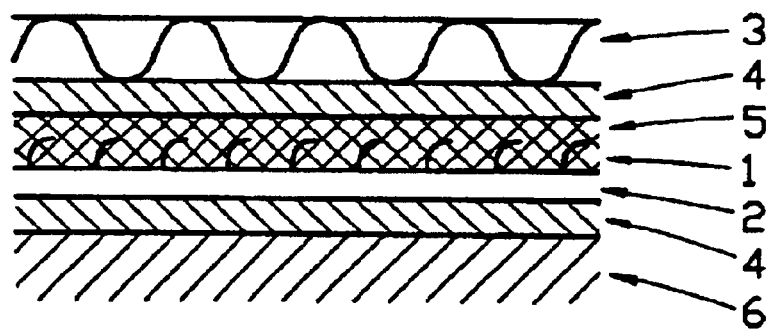

By virtue of these advantages, the invention is suitable for many applications of which some are mentioned by way of example in the following drawings:

FIG. 6 is a schematic cross-section through a known composite material. The composite material contains the following layers:
a) decorative layer (3),
b) adhesive layer (4),
c) textile layer (5),
d) film (2) with anchoring elements (1),
e) adhesive layer (4) and
f) substrate (6).

Figure 7:
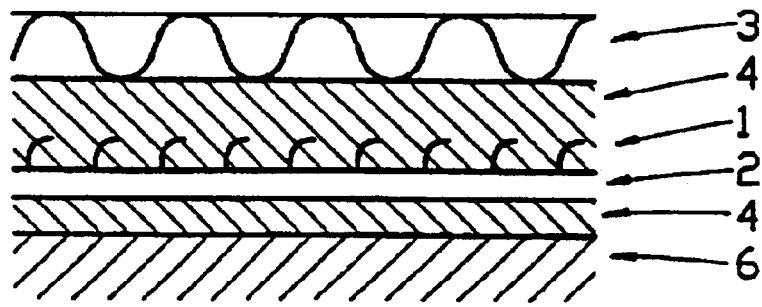

FIG. 7 is a schematic cross-section through a composite material according to the invention of the following layers:
a) decorative layer (3),
b) adhesive layer (4),
c) film (2) with anchoring elements (1),
d) adhesive layer (4) and
e) substrate (6).

This composite material is typical of many applications in the domestic sector; the decorative layer may consist, for example, of wood blocks or tiles.

Figure 8:
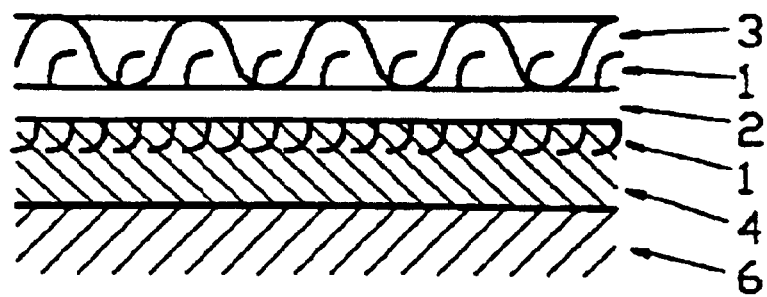

FIG. 8 is a schematic cross-section through a composite material according to the invention comprising the following layers:
a) decorative layer (3),
b) film (2) with anchoring elements (1) on both sides
c) adhesive layer (4) and
d) carpet as the fibrous substrate (6).

This composite material is typical of many applications where the set nonfibrous coherent layer is sufficient, for example plaster optionally augmented by a paint.

Figure 9:
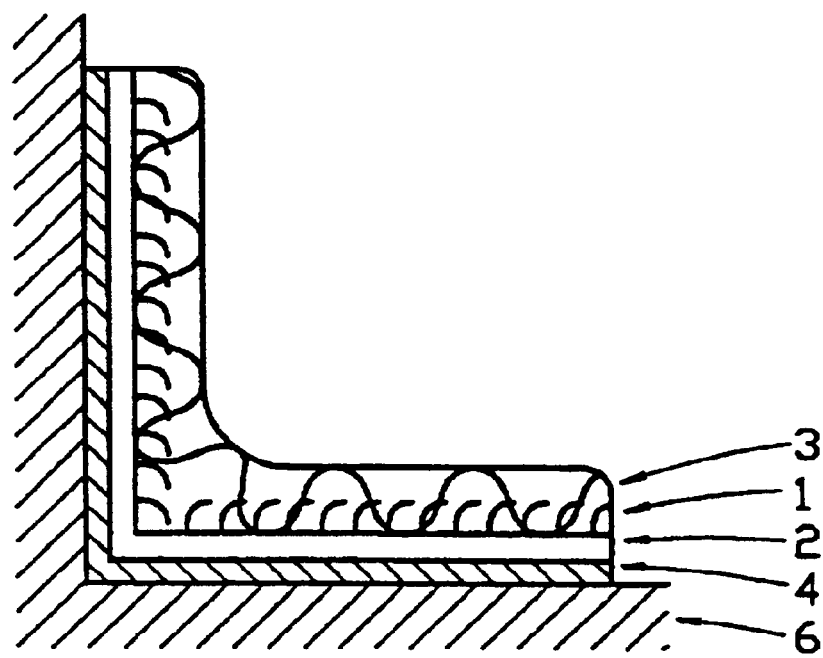

FIG. 9 is a schematic cross-section through an angled composite material according to the invention consisting of
a) a joint sealing compound as the coherent layer (4),
b) a film (2) with anchoring elements (1),
c) an adhesive layer (4) and
d) the substrate (6).

This composite material is particularly suitable for sealing gaps between walls and bathtubs because it seals very effectively in the long term and because the joint sealing compound can be easily replaced when its appearance has deteriorated.

Figure 10:
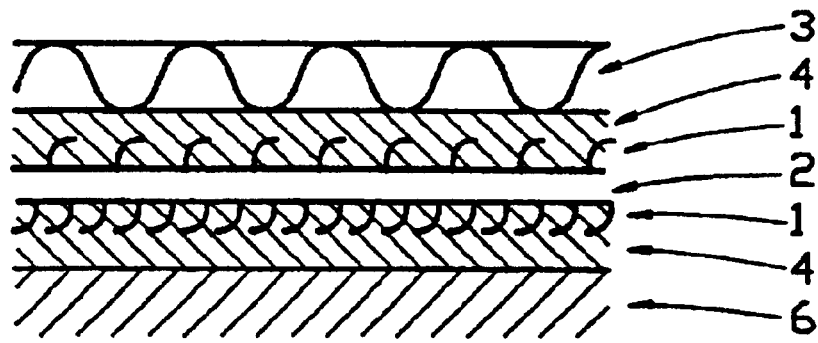

FIG. 10 is a schematic cross-section through a composite material according to the invention comprising relatively many layers, namely:
a) a covering (2) with anchoring elements (2),
b) an adhesive (4),
c) a film (2) with anchoring elements (1) on both sides,
d) an adhesive (4) and
e) a substrate (6) with anchoring elements (1).

This composite material is useful, for example, when the film with anchoring elements is to be joined on the one hand to the substrate and on the other hand to a covering with one and the same adhesive.

List of reference numerals
1 anchoring element
2 film
3 decorative layer
4 adhesive layer or nonfibrous coherent layer
5 textile layer
6 substrate

What is claimed is:

1. A method of nondestructive, reversible fixing of a coherent layer to a substrate, comprising the steps of reversibly anchoring a nonfibrous coherent layer to a film having either or both of projecting or embedded anchoring elements by applying a liquid or paste form material to a side of the film having the anchoring elements, which material embeds or fills the anchoring elements and sets to form the coherent layer mechanically anchored to the film, wherein the anchoring elements will remain largely intact after separation of the coherent layer from the film, and fixing the coherent layer and film to the substrate.

2. The method of claim 1, wherein the coherent layer is nonadhesive or only slightly adhesive to the film.

3. The method of claim 1, wherein the film comprises or is coated with a material to which the coherent layer shows very little or no adhesion.

4. The method of claim 3, wherein film comprises or is coated with one or more polyolefins, silicone, or fluorine polymers.

5. The method of claim 1, wherein the anchoring elements have a length of at least 0.05 mm.

6. The method of claim 5, wherein the anchoring elements have a length of at least 0.2 mm.

7. The method of claim 1, wherein one or more of the anchoring elements project from the surface of the film.

8. The method of claim 1, wherein the coherent layer is peeled away from the film and the anchoring elements are sufficiently deformable so that no more than 50% of the anchoring elements lose anchoring function after peeling of the coherent layer from the film.

9. The method of claim 1, wherein the coherent layer is peeled away from the film and the anchoring elements comprise a sufficiently deformable material so that at least 30% of the anchoring elements retain anchoring function after peeling of the coherent layer from the film.

10. The method of claim 9, wherein the anchoring elements comprise a plastic having a glass transition temperature below 25° C.

11. The method of claim 10, wherein the anchoring elements comprise a plastic having a glass transition temperature below 10° C.

12. The method of claim 9, wherein the anchoring elements comprise polyethylene or polypropylene.

13. The method of claim 1, wherein the anchoring elements comprise mushroom-shaped elements projecting from the film, said elements having a cap and a stalk, wherein the cap and stalk have a ratio of cross-sectional diameters of less than 10:1.

14. The method of claim 1, wherein the coherent layer is peeled away from the film and the coherent layer comprises a material that is sufficiently deformable so that less than 50% of the anchoring elements lose anchoring function after peeling of the coherent layer from the film.

15. The method of claim 1, wherein the anchoring elements comprise a material that is nondeformable or substantially nondeformable in the form of a thin layer with a thickness of 0.05 mm to 10 mm.

16. The method of claim 15, wherein the material comprising the anchoring elements is a resilient material having less than 30% deformability.

17. The method of claim 15, wherein the material comprising the anchoring elements is a non-resilient material having less than 15% deformability.

18. The method of claim 1, wherein the anchoring elements comprise metal, ceramic, glass, or a thermoset or thermoplastic having a glass transition temperature of at least 0° C.

19. The method of claim 18, wherein the thermoset or thermoplastic has a glass transition temperature of at least 25° C.

20. The method of claim 1, wherein the anchoring elements are shaped to slide out from the coherent layer when it is peeled from the film.

21. The method of claim 1, wherein the coherent nonfibrous layer consists of a single layer.

22. The method of claim 21, wherein the coherent nonfibrous layer consists of a plaster, paint, lacquer, sealing, road marking, or PU foam layer.

23. The method of claim 1, wherein the coherent nonfibrous layer comprises at least one layer.

24. The method of claim 23, wherein coherent nonfibrous layer comprises an adhesive layer.

25. The method of claim 24, wherein the adhesive layer comprises an adhesive having a glass transition temperature below 25° C. in its set state.

26. The method of claim 24, wherein the adhesive layer is based on a dispersion adhesive.

27. The method of claim 23, wherein the coherent nonfibrous layer comprises a surface layer.

28. The method of claim 27, wherein the surface layer comprises tile, wood, wall covering, or plastic molding.

29. The method of claim 1, wherein the film is fixed to the substrate by adhesives, nails, or screws.

30. The method of claim 1, wherein the substrate is a wall, ceiling, or floor of a building or motor vehicle.

31. The method of claim 1, wherein the film is mechanically fixed to the substrate by anchoring elements either directly or indirectly via a coherent nonfibrous layer.

32. The method of claim 31, wherein the coherent nonfibrous layer fixing the film to the substrate comprises an adhesive layer.

33. The method of claim 32, wherein the adhesive layer fixing the film to the substrate adheres to the substrate at least 50% stronger than to the coherent nonfibrous layer anchored to the film.

34. The method of claim 33, wherein the coherent nonfibrous layer anchored to the film and the adhesive layer fixing the film to the substrate comprise the same material.

35. The method of claim 1, wherein the film having the anchoring elements has holes making up at most 10% of its surface.

* * * * *